United States Patent
Wang et al.

(10) Patent No.: US 8,916,126 B1
(45) Date of Patent: Dec. 23, 2014

(54) METHOD OF FABRICATING GRAPHITE FLAKES

(71) Applicant: Chung-Shan Institute of Science and Technology, Armaments Bureau, M.N.D., Taoyuan County (TW)

(72) Inventors: Chung-An Wang, Taoyuan County (TW); Chun-Han Lin, Taoyuan County (TW); Chuen-Ming Gee, Taoyuan County (TW); Pai-Lu Wang, Taoyuan County (TW); Ching-Jang Lin, Taoyuan County (TW); Chia-Wei Liao, Taoyuan County (TW)

(73) Assignee: Chung-Shan Institute of Science and Technology, Armaments Bureau, M.N.D., Taoyuang County (TW)

( * ) Notice: Subject to any disclaimer, the term of this patent is extended or adjusted under 35 U.S.C. 154(b) by 0 days.

(21) Appl. No.: 14/133,281

(22) Filed: Dec. 18, 2013

(51) Int. Cl.
*C01B 31/04* (2006.01)

(52) U.S. Cl.
USPC .............................................. 423/448

(58) Field of Classification Search
CPC C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28
USPC .......................................... 423/448
See application file for complete search history.

*Primary Examiner* — Daniel C McCracken
(74) *Attorney, Agent, or Firm* — Chun-Ming Shih

(57) ABSTRACT

In a method of fabricating graphite flakes applied in a graphite nanomaterial, mesophase pitch and an organic solvent are used to produce a carbon precursor slurry, and the carbon precursor slurry is coated by a scraper to produce the graphite flakes. Since the method of using natural graphite as a raw material in production requires a number of purification processes to manufacture an expanded graphite powder before the graphite flakes can be produced, and thus the fabricating cost is very high, and other high-priced materials such as polyimide (PI) or graphene also will increase the total cost.

16 Claims, 1 Drawing Sheet

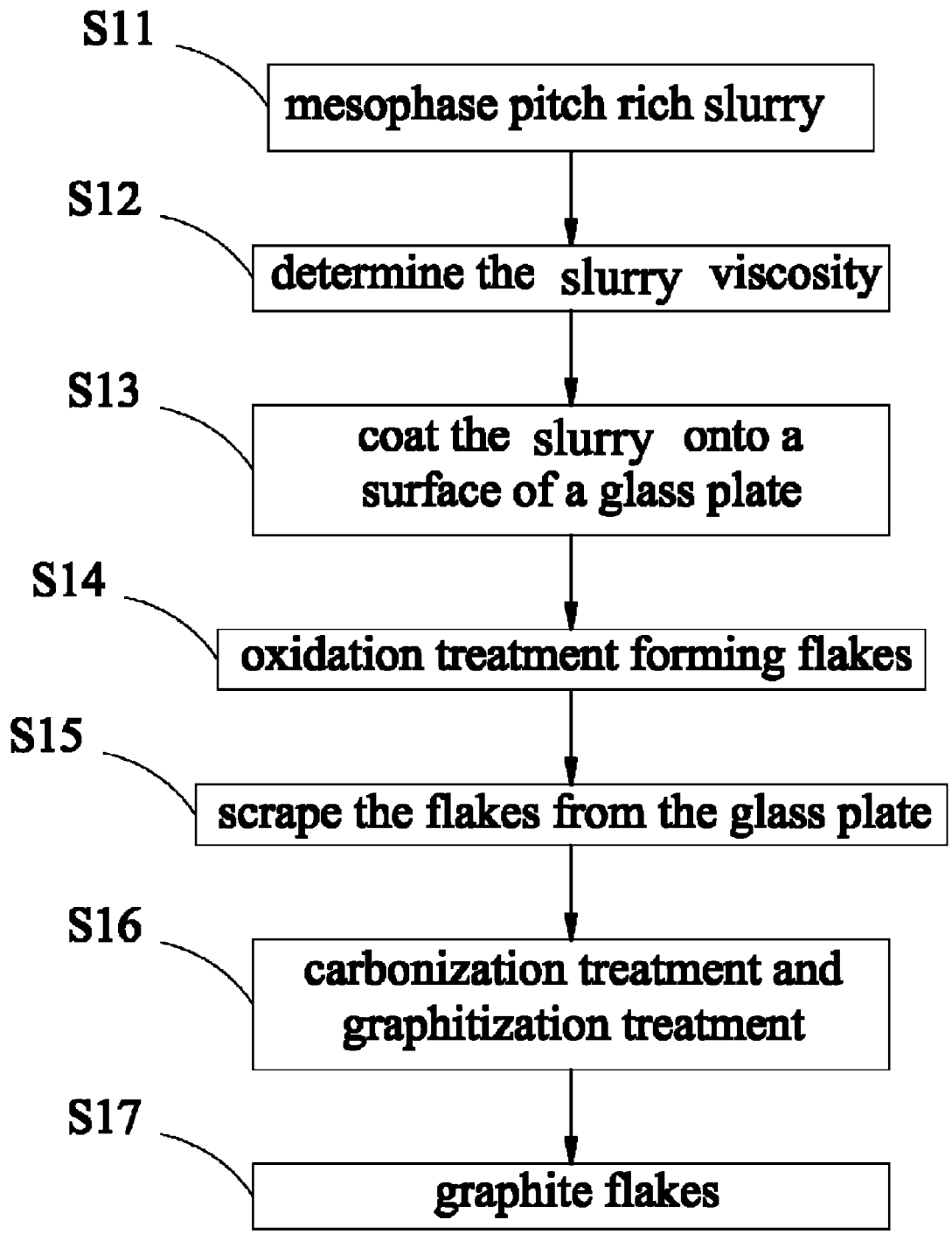

US 8,916,126 B1

METHOD OF FABRICATING GRAPHITE FLAKES

BACKGROUND OF THE INVENTION

1. Field of Invention

The present invention relates to a method of fabricating graphite flakes, and more particularly to the method of fabricating the graphite flakes applied in graphite nanomaterials and having the features of convenient operation, high safety, energy saving, low operation cost.

2. Description of Related Art

In recent years, graphene with the features of high thermal conductivity, outstanding mechanical stiffness, great fracture strength and excellent carrier mobility has become an eye-catching novel material. Although continuous efforts are required to implement the graphene material into devices, graphene has already been used as a filler for polymer nano composites.

However, it is still an important and urgent subject for related manufacturers to find a way of fabricating high-purity and dispersed graphene in mass production. U.S. Publication No. 20050014867A1 discloses a method of mechanically peeling the graphite to obtain pure graphene flakes was simple, easy, and extensively used, but such method has the shortcoming of a low yield, and the graphene flakes cannot be produced in a large scale. Further, some scholars suggested to dip graphite particles or fibers into a mixed solution of strong oxidizer including sulfuric acid and nitric acid, so that each layer of the graphite is oxidized uniformly to produce an oxidized graphite composite, and then the composite is washed continuously by water to remove the acid solutions until the composite is neutral, and then a furnace at a high temperature from 1100° C. to 1250° C. is used for expanding and peeling the oxidized graphite composite to form a two-dimensional graphene. U.S. Publication No. 20080258359A1 discloses hundreds of grams of graphite particles are oxidized by sulfuric acid and nitric acid to form an intercalated graphite composite, and then washed by de-ionized water continuously to obtain expanded graphite, and then the expanded graphite is heated different temperatures of 600° C. and 1050° C. and dispersed in water, and vibrated by ultrasonic waves to peel off the expanded graphite, and finally a ball mill is provided for milling the peeled-off expanded graphite to form graphene with a nanoscale thickness.

However, the aforementioned method involving the oxidation of mixed acids and the heat treatment is complex and trivial, and thus it is difficult to be used for mass production. As disclosed in U.S. Publication No. 20090235721A1, a method to fabricate and oxidize graphite, and rotably coat the graphite onto a silicon oxide substrate, and then reduced by a high-temperature steam of hydrazine hydrate at 100° C. for 20 hours to reduce the oxidized graphite back to graphene.

However, this method can manufacture graphene having functional groups on its surface only. Alternatively, nickel with a thickness of 100 nm is spluttered and deposited on a surface of a silicon dioxide substrate, and then a carbon source such as ethylene is passed into a reaction chamber to crack the ethylene into carbon and nickel solid solutions which are supersaturated and precipitated, and deposited on the surface of the nickel layer to form one or more layers of graphene, and then the materials are put into 0.1 M hydrochloric acid to etch the nickel plated layer to obtain graphene. This method can produce graphene with a small number of layers on a substrate of a large area, and may be able to manufacture graphene by a large area, but the operation procedure requires the condition of a high temperature of 950° C. to thermally crack the carbon source in order to achieve a specific lattice direction for the carbon deposition, or else amorphous carbon films may be produced easily. Further, some scholars also adopt 25-micron copper foil to replace the nickel film to grow high-quality large-area graphene, and the advantages of this method reside on its using copper foil as the substrate without requiring any spluttering process, and the grown graphite has a better quality.

As described above, the prior arts still have the following drawbacks: The method of using natural graphite as a raw material requires a purification process to produce the expanded graphite powder, and thus incurring a higher fabricating cost. The method of using the expensive PI as a raw material incurs a higher material cost. The method of costing graphene on a surface incurs a higher fabricating cost.

SUMMARY OF THE INVENTION

In view of the aforementioned problems, the present invention provides a method of fabricating of fabricating graphite flake with the following advantages. The present invention uses a low-cost material to produce high-quality graphite flakes with high orientation quickly and avoid using the expensive PI material.

Therefore, it is a primary objective of the present invention to manufacture low-cost, rapidly formed and high-quality graphite flakes by using mesophase pitch as a raw material, so as to save the fabricating cost.

To achieve the foregoing objective, the present invention provides a method of fabricating graphite flakes and creates a high value-added carbon product that can be applied in the field of dissipating the heat of portable electronic 3C products.

The technical characteristics, objectives and advantages of the present invention can be further understood by the following detailed description of preferred embodiments and related drawings.

BRIEF DESCRIPTION OF THE DRAWING

FIG. 1 is a flow chart of a method of fabricating graphite flakes in accordance with the present invention.

DETAILED DESCRIPTION OF THE INVENTION

With reference to FIG. 1 for a flow chart of a method of fabricating graphite flakes with the features of high environmental friendliness low cost, quick formation, and high quality, the method includes a total of seven steps including Steps (11) to (17).

Step (11): Mix an organic solvent such as ethanol, acetone, toluene, methylpyrrolidone, quinoline, pyridine or any mixture of the above with a mesophase pitch (or an anisotropic pitch) of 50 wt % uniformly to produce a mesophase pitch rich slurry by a conventional mix apparatus, wherein the rotation time in Step (11) is controlled within a range of 0.1~5 hrs, and preferably within a range of 0.5~3 hrs, and the rotation speed of the mix apparatus is controlled within a range of 5~100 rpm, and preferably within a range of 10~50 rpm.

Step (12): Measure the slurry viscosity of the mesophase pitch rich slurry of Step (11) and determine whether the slurry viscosity falls within a range of 50~1,000 cps, and preferably within a range of 100~500 cps; if yes, then go to the Step (13), or else return to the Step (11). If the slurry viscosity is greater than 1,000 cps, the fluidity is worse, indicating that the percentage of the mesophase pitch is too high, so that thin films cannot be formed easily in the later fabricating processes. If the slurry viscosity is lower than 50 cps, the fluidity of the slurry is good, because fluid with low viscosity flow much more easier than that with high viscosity, and indicating that the percentage of the organic solvent is excessive, so that thin films cannot be fabricated by scraping. If the slurry viscosity falls within a range of 50~1,000 cps, the fabricating process enters into the Step (13), and the mesophase pitch rich slurry is coated onto a surface of a glass plate by tape casting, wherein the scraper speed is controlled within a range of 0.1~10 mm/sec, and preferably within a range of 0.2~5 mm/sec, and films formed after the scraping process has a thickness smaller than 400 microns, and the films are placed in an oven. Step (14): Conduct oxidation by oxygen or air to form stabilized carbon flakes, wherein the oxidation temperature provided by the oven is controlled within a range of 200~300° C., and preferably within a range of 220~280° C., and the oxidation time is controlled within a range of 0.1~5 hrs, and preferably within a range of 0.5~3 hrs. As a result of that, the contained solvent is removed, and the film is cracked into the flakes due to cross-linking reaction.

It is noted that, when said slurry viscosity is large than a critical value, the flakes may not be formed; otherwise, when said slurry viscosity approaches to 50 cps, the type of product may be powder. However, in the predetermined range of slurry viscosity, the average scale of each flake is in a range of 10-2000 μm.

Step (15) Cover a layer of soft material such as unwoven cloth, cotton cloth, cotton paper, release paper or any mixture of the above onto a surface of a scraper, and scrape the flakes from the surface of the glass plate.

Step (16): Conduct carbonization treatment to carbonize the stabilized carbon flakes, wherein the carbonization temperature is controlled within a range of 600~1500° C., and preferably within a range of 1000~1400° C., The carbonization is the term for conversion of an organic substance (the pitch) into carbon containing residue through pyrolysis. In the graphitization of the Step (16), the graphitization temperature is controlled within a range of 2000~3300° C., and preferably within a range of 2300~3000° C.

Step (17): After the graphitization, the carbon flakes are converted into graphite flakes having high optical-anisotropic and high orientation graphite structure. While the invention has been described by means of specific embodiments, numerous modifications and variations could be made thereto by those skilled in the art without departing from the scope and spirit of the invention set forth in the claims.

What is claimed is:

1. A method of fabricating graphite flakes, characterized in that mesophase pitch and an organic solvent are used to fabricate a mesophase pitch rich slurry for fabricating the graphite flakes, and the method comprises the steps of:
   Step (11): fabricating a mesophase pitch rich slurry from the mesophase pitch and the organic solvent;
   Step (12): determining whether the viscosity of the mesophase pitch rich slurry falls within a predetermined range, and entering into the Step (13) if the viscosity falls within the predetermined range, or returning to the Step (11), if the viscosity does not fall within the determined range;
   Step (13): coating the mesophase pitch rich slurry onto a surface of a glass plate;
   Step (14): conducting oxidation treatment to convert the mesophase pitch rich slurry into flakes;
   Step (15): removing flakes from the surface of the glass plate; and
   Step (16): conducting carbonization treatment and graphitization treatment.

2. The method of fabricating graphite flakes of claim 1, wherein the mesophase pitch of the Step (11) has a content greater than 50 wt % or more.

3. The method of fabricating graphite flakes of claim 1, wherein the organic solvent of the Step (11) is one selected from the group consisting of ethanol, acetone, toluene, methylpyrrolidone, quinoline, pyridine and a mixture thereof.

4. The method of fabricating graphite flakes of claim 1, wherein the Step (11) further includes a rotation time and a rotation speed.

5. The method of fabricating graphite flakes of claim 4, wherein the rotation time is controlled within a range of 0.1~5 hrs.

6. The method of fabricating graphite flakes of claim 4, wherein the rotation speed is controlled within a range of 5~100 rpm.

7. The method of fabricating graphite flakes of claim 1, wherein the viscosity of the Step (12) within a range of 50~1,000 cps.

8. The method of fabricating graphite flakes of claim 1, wherein the Step (13) is carried out by scraping.

9. The method of fabricating graphite flakes of claim 8, wherein a scraper speed is controlled within a range of 0.1~10 mm/sec.

10. The method of fabricating graphite flakes of claim 1, wherein an oxidation temperature of the Step (14) is controlled within a range of 200~300° C.

11. The method of fabricating graphite flakes of claim 1, wherein an oxidation time of the Step (14) is controlled within a range of 0.1~5 hrs.

12. The method of fabricating graphite flakes of claim 1, wherein the Step (15) is carried out by a scraper covered by a layer of a soft material.

13. The method of fabricating graphite flakes of claim 12, wherein the soft material is one selected from the group consisting of unwoven cloth, cotton cloth, cotton paper, release paper and a mixture thereof.

14. The method of fabricating graphite flakes of claim 1, wherein a carbonization temperature of the Step (16) is controlled within a range of 600~1500° C.

15. The method of fabricating graphite flakes of claim 1, wherein a graphitization temperature of the Step (16) is controlled within a range of 2000~3300° C.

16. The method of fabricating graphite flakes of claim 1, wherein the thin film formed on a surface of the glass plate has a thickness smaller than 400 microns.

* * * * *